A. P. OSBORNE.
Lawn-Mowers.

No. 210,625. Patented Dec. 10, 1878.

WITNESSES
Geo. W. Breck.
Wm A. Skinkle

INVENTOR
Alvah P. Osborne
By his Attorneys
Baldwin, Hopkins & Payton.

2 Sheets—Sheet 2.

A. P. OSBORNE.
Lawn-Mowers.

No. 210,625. Patented Dec. 10, 1878.

WITNESSES
Geo. W. Breck.
Wm. A. Skinkle

INVENTOR
Alvah P. Osborne
By his Attorneys
Baldwin, Hopkins & Peyton.

UNITED STATES PATENT OFFICE.

ALVAH P. OSBORNE, OF TRUMANSBURG, NEW YORK, ASSIGNOR TO ORNAN OSBORNE, OF SAME PLACE.

IMPROVEMENT IN LAWN-MOWERS.

Specification forming part of Letters Patent No. 210,625, dated December 10, 1878; application filed November 7, 1878.

*To all whom it may concern:*

Be it known that I, ALVAH P. OSBORNE, of Trumansburg, in the county of Tompkins and State of New York, have invented certain new and useful Improvements in Lawn-Mowers, of which the following is a specification:

My invention relates to lawn-mowers of that class adapted to be pushed or propelled before the operator, in the operation of mowing, by a suitable handle or tongue, the motion thus gained being imparted to a rotary cutter-wheel, knives, or blades, which, in connection with a stationary cutter or knife arranged relatively to the rotary cutter, shears or cuts off the grass as the machine progresses.

The object of my present invention is to furnish a light, simple, and effective mower belonging to the class above mentioned, and at a reduced expense.

The subject-matter claimed hereinafter specifically will be designated.

Figure 1:
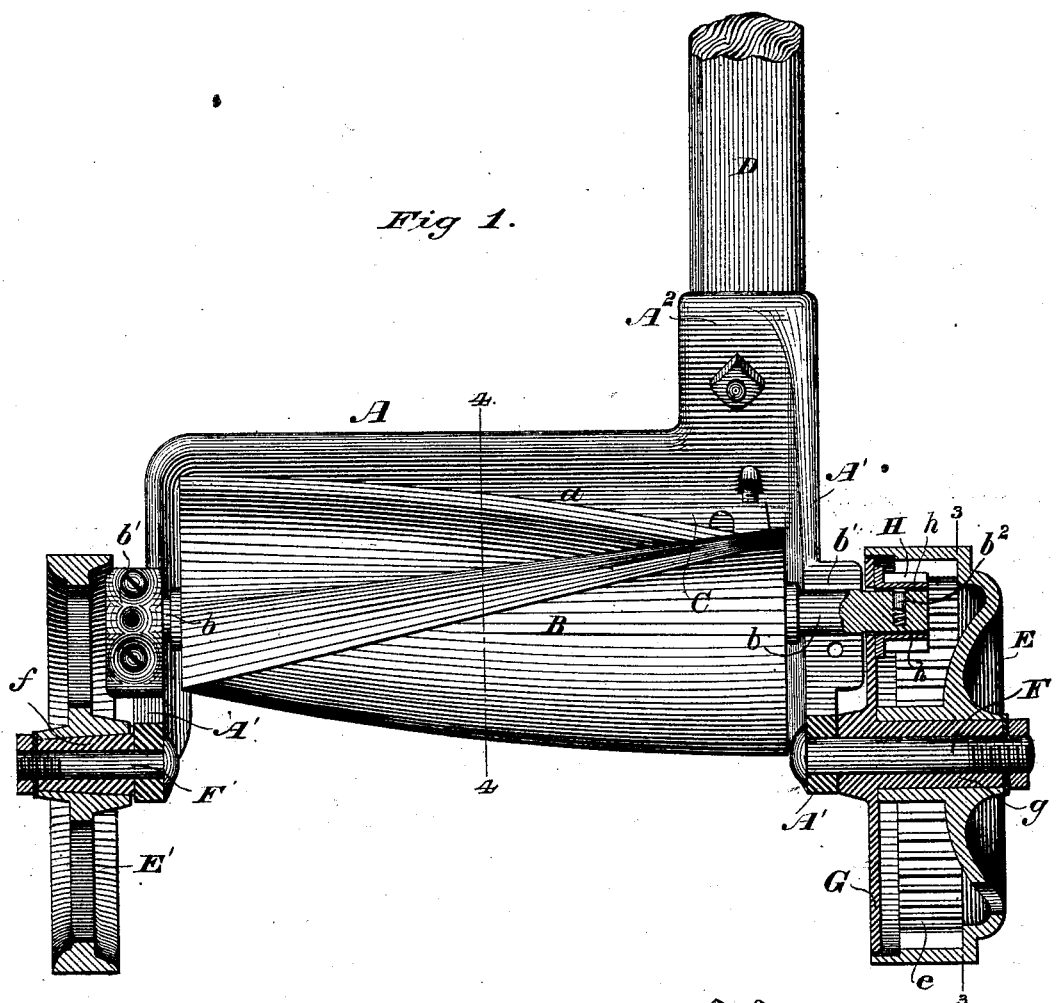
Figure 2:
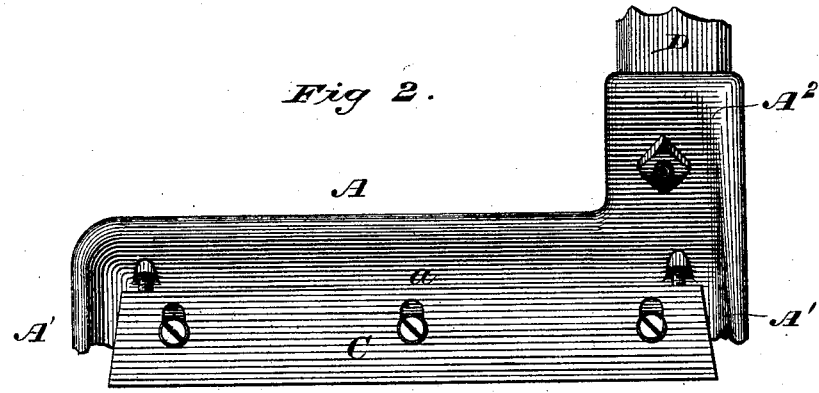
Figure 3:
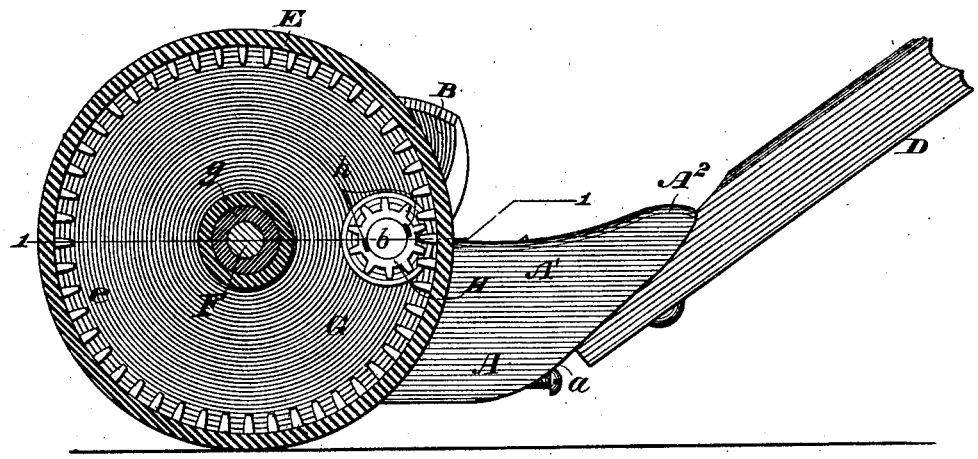
Figure 4:
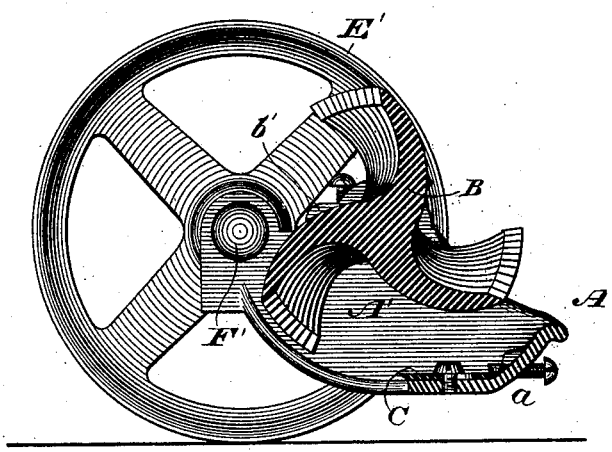

In the accompanying drawings, which show my improvements as embodied in the best way now known to me, Figure 1 is a top or plan view of my improved lawn-mower, partly in section, on the line 1 1 of Fig. 3, to more clearly show the manner of supporting and driving the rotary cutter, the handle being also broken away. Fig. 2 is a detached view of a portion of the frame of the machine, showing the stationary cutter secured thereto. Fig. 3 is a vertical transverse section through the driving and supporting wheel on the line 3 3 of Fig. 1; and Fig. 4, a central transverse section through the machine on the line 4 4 of Fig. 1.

The frame A of the mower is, preferably, of metal, cast in a single piece. At each side or end of the frame is an extension, $A^1$, rising preferably at right angles, or nearly so, to the central or horizontal portion of the frame, which portion is slightly concave for the reception and more perfect working of a rotating spiral-edged cutter or knives, B, of well-known construction. The shaft or axle $b$ of the rotary cutter has its bearings at each side in suitable boxes $b^1$, in the extensions or standards $A^1$ of the frame, between which standards and close to the concave portion $a$ of the frame the cutter B revolves when the mower is at work. Beneath and in proper relation to the rotary cutter or knife B, and upon the front edge of the depressed or central portion of the frame, is mounted a fixed or stationary knife, cutting-edge, or cutter, C, which is preferably rendered adjustable backward and forward by suitable slots and set-screws in well-known ways, and for an obvious purpose. (See Figs. 2 and 4.)

At the back of the frame, and upon one side or end thereof, is an extension, $A^2$, which forms, in fact, a rearward continuation of one of the side pieces or extensions of the frame. The handle or tongue D is secured to this extension, and constitutes the medium by which the machine is pushed or propelled forward over the ground.

The frame is supported at each side or end by wheels E E′, independently and detachably mounted upon short or stud axles or trunnions F F′, projecting from or having their bearings in the upper front edge of the extensions or standards $A^1$ of the frame, in a line with or diametrically opposite each other.

The wheel E is closed at its outer side, as usual in inclosed-gearing lawn-mowers, and constitutes the driving-wheel of the machine, being provided with an internal spur-gear, $e$, cast upon the rim in a well-known way.

The hub of the drive-wheel, instead of fitting upon an axle which spans the frame, or directly upon a supporting stud-axle on the extension or upright $A^1$ of the frame, is mounted and turns upon a tubular spindle or journal, $g$, (through which passes the stud-bolt F, projecting from the frame,) forming a part of or secured to a non-rotating plate or disk, G, which fits snugly and removably within the rim of the wheel, opposite its closed outer side, thereby completely inclosing or incasing the gear of the drive-wheel, and protecting it from access of injurious or clogging matter.

The end next the drive-wheel of the axle or shaft $b$ of the rotary cutter projects through a suitable opening in the casing-plate G into the interior of the drive-wheel, and carries upon its end a loosely-mounted pinion, H, of well-known construction, the teeth of which mesh with the internal spur-gear of the drive-wheel, to rotate the cutter.

The pinion is provided with suitable grooves, recesses, or ratchets, $h$, and the axle $b$ with a suitable engaging device or pawl, $b^2$, of well-known construction, whereby the pinion and axle are engaged and the cutter positively driven as the machine progresses in a forward direction, while during backward movement of the machine the pinion turns loosely on its axle without rotating the cutter, in a well-known way.

The gearing-covering plate G, loosely fitted upon the inside of the drive-wheel, about the stud-bolt axle F, is prevented from revolving or rocking independently of the frame by the cutter-axle $b$, which passes through it.

The wheel E' may be of any suitable well-known construction, and is designed to support the outer end of the frame, which extends laterally from the drive-wheel and carries the cutting apparatus. The sleeve or journal $f$, upon which this wheel is mounted, is preferably of a tapering form, corresponding to the opening in the hub of the wheel, whereby, in connection with a suitable adjusting screw-nut on the end of the stud bolt or axle F', wear may be compensated, and the machine made to run easily and noiselessly.

It will be obvious from the foregoing description that the machine may be made very light; that it is simple in its construction; that but one wheel is employed as a driver; and that in the organization shown side draft is overcome by locating the handle near about the inner end of the main frame, next the drive-wheel and inside thereof, or close to this wheel and between it and the supporting-wheel at the opposite or outer end of the frame.

Experience has demonstrated the machine to be an easy-running and effective mower.

By the manner described of mounting the supporting-wheel E' upon a stud-axle directly connected with the main frame, and mounting the driving-wheel E upon the frame through the medium of the detachable gear-inclosing disk, an unobstructed space is left between the wheels in advance of the rotary cutter, the cutter-axis is brought over or in the vertical plane of the bed-knife, and either wheel may readily be removed without interfering with the other, for inspection, repair, or renewal of the parts, thus rendering the machine inexpensive as compared with inclosed-gear machines heretofore most commonly employed, and single drive-wheel machines heretofore known.

I claim as my invention—

1. The drive-wheel of a lawn-mowing machine open at one side only, and provided with an internal spur-gear adapted to mesh with and drive a pinion to impart motion to a rotary cutter, in combination with a plate or disk inclosing the gearing, a portion or extension of which plate forms the journal upon which the drive-wheel turns, substantially as hereinbefore set forth.

2. The lawn-mower frame A, cast with the side extensions $A^1$ rising from the central or horizontal portion of the frame, (which is slightly concave for the reception of a rotary cutter having its bearings in said extensions,) and with an extension, $A^2$, at one side, to which the handle or tongue of the machine is attached, substantially as hereinbefore set forth.

3. The combination, substantially as hereinbefore set forth, of the single drive-wheel, the supporting-wheel, the frame inside of or between these wheels, and provided with a stud-axle for the supporting-wheel, the handle secured to the frame inside of and close to the drive-wheel, the inside gear-inclosing plate, its tubular spindle or journal for the drive-wheel, and the stud-axle of the frame, about which the drive-wheel revolves on the said inclosing-plate spindle, for the purpose described.

In testimony whereof I have hereunto subscribed my name.

ALVAH P. OSBORNE.

Witnesses:
SANFORD C. CONDE,
ARTHUR S. GREGG.